US012658652B2

(12) United States Patent
He et al.

(10) Patent No.: US 12,658,652 B2

(45) Date of Patent: Jun. 16, 2026

(54) ELECTROMAGNETIC ISOLATION ASSEMBLY AND CONNECTOR

(71) Applicant: Tyco Electronics (Shanghai) Co., Ltd., Shanghai (CN)

(72) Inventors: Hua He, Shanghai (CN); Yingchun (David) Wang, Shanghai (CN); Yong (Chris) Wang, Shanghai (CN); Daokuan (Jeremy) Zhang, Shanghai (CN); Yong Yang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 371 days.

(21) Appl. No.: 18/536,568

(22) Filed: Dec. 12, 2023

(65) Prior Publication Data

US 2024/0195128 A1 Jun. 13, 2024

(30) Foreign Application Priority Data

Dec. 13, 2022 (CN) ........................ 202223346902.X

(51) Int. Cl.

| | |
|---|---|
| ***H01R 13/6585*** | (2011.01) |
| ***H01R 13/50*** | (2006.01) |
| ***H01R 13/6591*** | (2011.01) |
| *H01R 13/623* | (2006.01) |

(52) U.S. Cl.

CPC ......... *H01R 13/6585* (2013.01); *H01R 13/50* (2013.01); *H01R 13/6591* (2013.01); *H01R 13/623* (2013.01)

(58) Field of Classification Search

CPC ............ H01R 13/6585; H01R 13/6591; H01R 13/40; H01R 13/6584; H01R 13/65912

USPC ..... 439/607.05, 607.06, 607.08, 572, 607.28

See application file for complete search history.

(56) References Cited

U.S. PATENT DOCUMENTS

| | | | | |
|---|---|---|---|---|
| 11,804,675 B2 * | 10/2023 | He | H01R 13/6582 | |
| 12,374,835 B2 * | 7/2025 | He | H01R 27/02 | |
| 2010/0025069 A1 * | 2/2010 | Smith, III | H02G 15/184 | 174/98 |
| 2022/0190526 A1 * | 6/2022 | He | H01R 13/6585 | |
| 2025/0174942 A1 * | 5/2025 | Dong | H01R 13/424 | |

* cited by examiner

*Primary Examiner* — Hae Moon Hyeon

(74) *Attorney, Agent, or Firm* — Barley Snyder

(57) ABSTRACT

An electromagnetic isolation assembly adapted to be inserted into a slit of an insulator of a connector includes a metal isolation component and an electrical isolation component. The metal isolation component is adapted to electromagnetically isolate a power terminal inserted in the insulator from a signal terminal inserted in the insulator. The electrical isolation component is fixed to the metal isolation component and increases a creepage distance between the power terminal and the signal terminal.

20 Claims, 5 Drawing Sheets

ELECTROMAGNETIC ISOLATION ASSEMBLY AND CONNECTOR

CROSS-REFERENCE TO RELATED APPLICATION

This application claims the benefit of Chinese Patent Application No. CN202223346902.X filed on Dec. 13, 2022, in the State Intellectual Property Office of China, the whole disclosure of which is incorporated herein by reference.

FIELD OF THE INVENTION

The present invention relates to an electromagnetic isolation assembly and a connector including the electromagnetic isolation assembly, and in particular, to an electromagnetic isolation assembly used to electromagnetic separate a power terminal and a signal terminal of the connector.

BACKGROUND

A power terminal of a connector can cause electromagnetic interference of signal transmissions passed by a signal terminal of the connector, significantly affecting the reliability of the signal transmissions. In order to reduce the electromagnetic interference of the power terminal on the signal terminal, a metal sheet may be inserted into the insulation of the connector, which separates the power terminal and the signal terminal electromagnetically. However, a distance between the end of the metal sheet and the end of the signal terminal is typically relatively short, which reduces the creepage distance between the power terminal and the signal terminal, and which can cause short circuits in the signal terminal. This results in the electrical insulation performance of the connector not meeting industry requirements.

SUMMARY

According to an embodiment of the present disclosure, an electromagnetic isolation assembly adapted to be inserted into a slit on an insulator of a connector includes a metal isolation component and an electrical isolation component. The metal isolation component is adapted to electromagnetically isolate a power terminal inserted in the insulator from a signal terminal inserted in the insulator. The electrical isolation component is fixed to the metal isolation component and increases a creepage distance between the power terminal and the signal terminal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
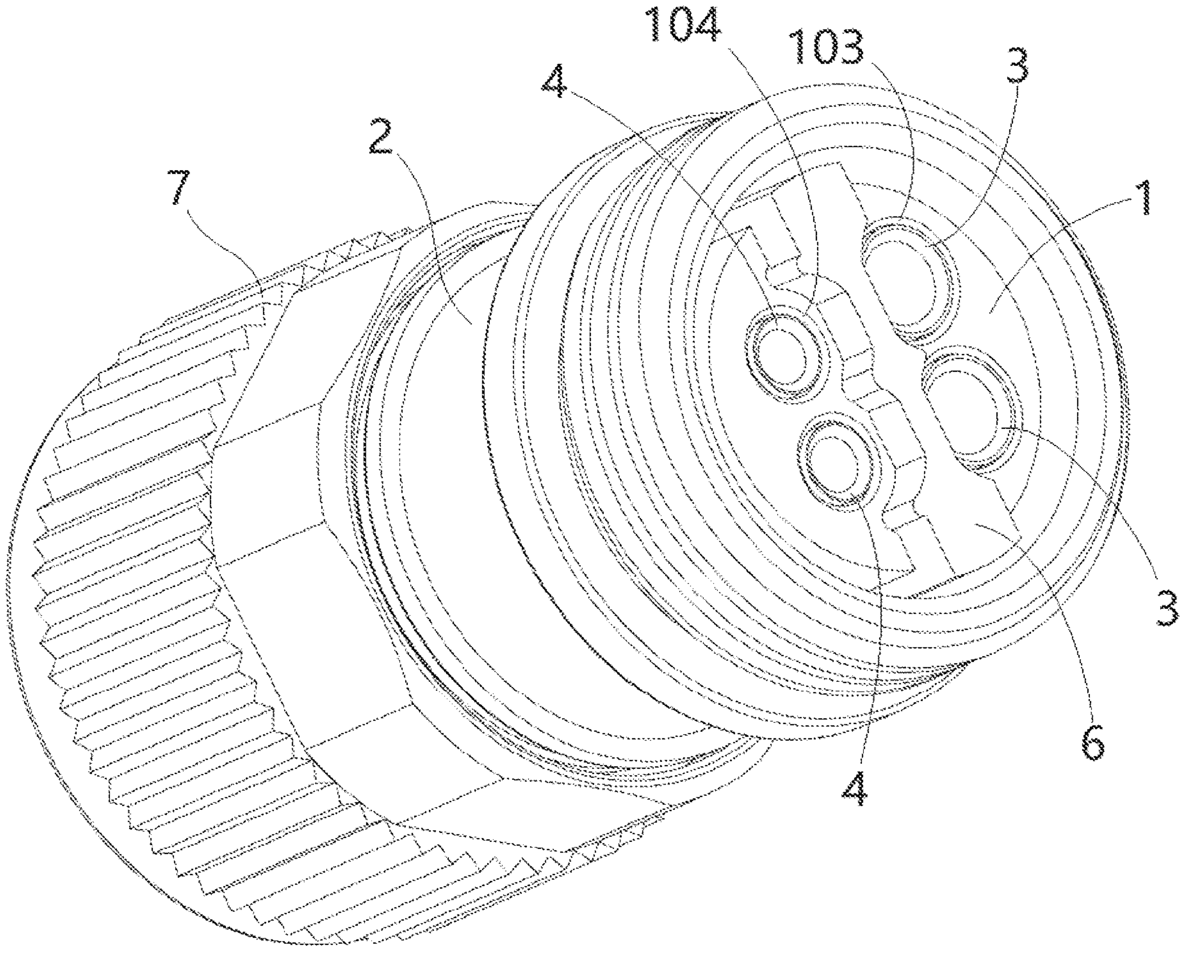
FIG. 1 is an illustrative perspective view of a connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, an electromagnetic isolation assembly is provided which is adapted to be inserted into a slit on an insulator of a connector. The electromagnetic isolation assembly includes a metal isolation component and an electrical isolation component. The metal isolation component is adapted to electromagnetically isolate a power terminal inserted in the insulator from a signal terminal inserted in the insulator. The electrical isolation component is fixed to the metal isolation component and increases the creepage distance between the power terminal and the signal terminal.

According to another embodiment of the present disclosure, a connector includes an insulator, a power terminal, a signal terminal, and the above electromagnetic isolation assembly. The insulator is formed with a slit and a power terminal hole and a signal terminal hole respectively located at both sides of the slit. The power terminal is inserted into the power terminal hole on the insulator. The signal terminal is inserted into the signal terminal hole on the insulator. The electromagnetic isolation assembly is inserted into the slit of the insulator.

Figure 2:
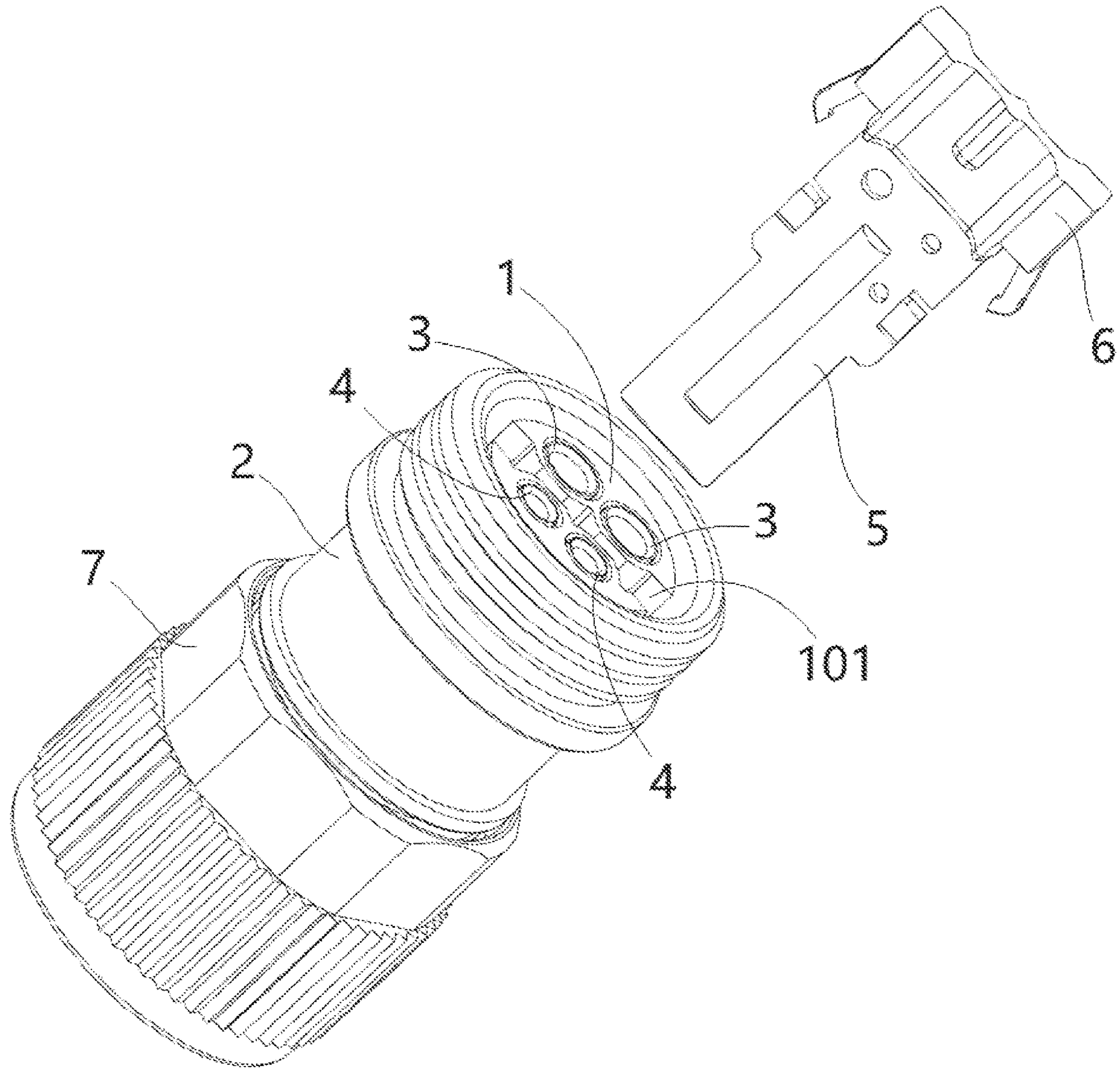
FIG. 2 is an illustrative exploded view of a connector according to an exemplary embodiment of the present invention.
Figure 3:
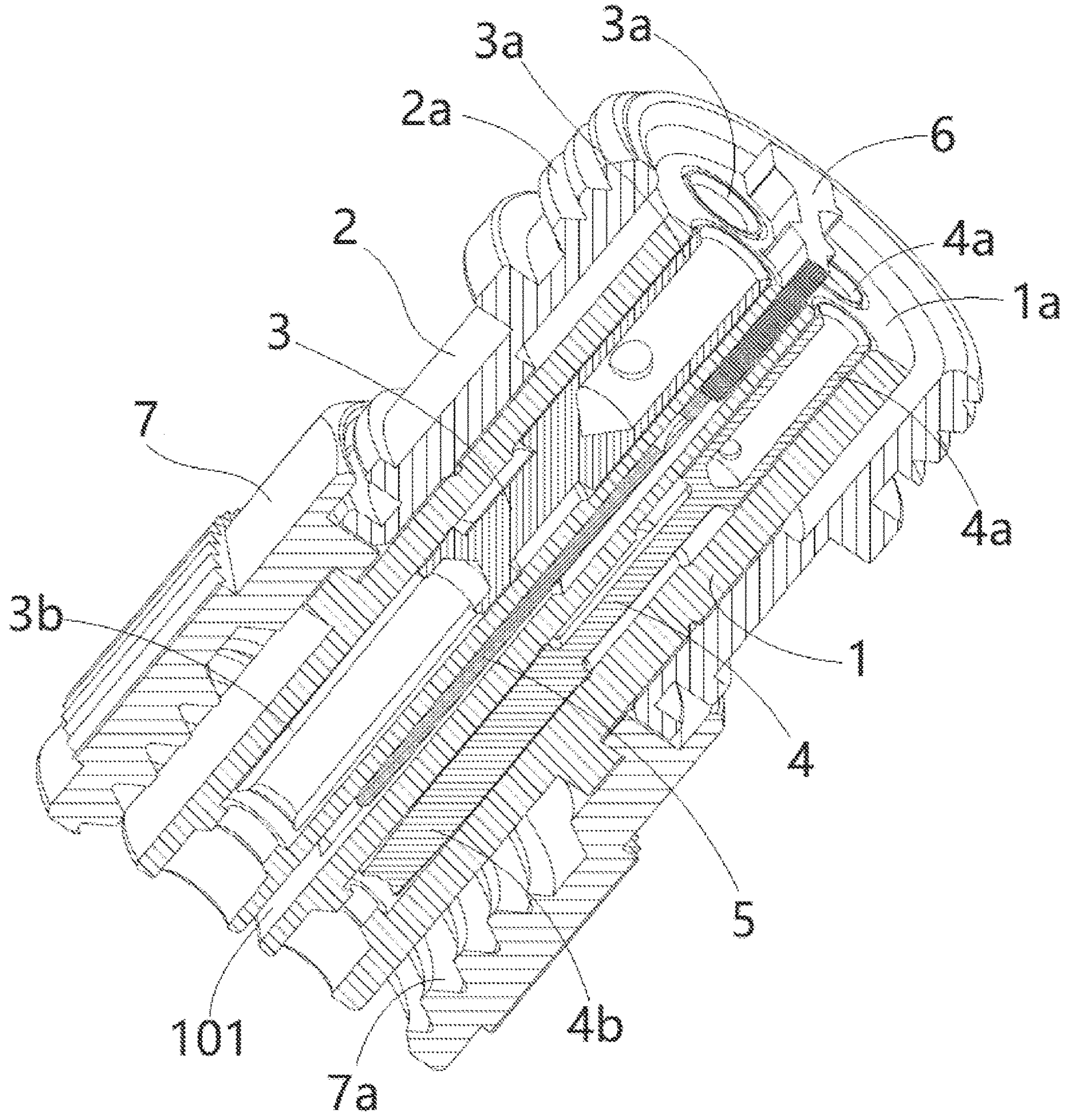
FIG. 3 is an axial cross-sectional view of a connector according to an exemplary embodiment of the present invention.
Figure 4:
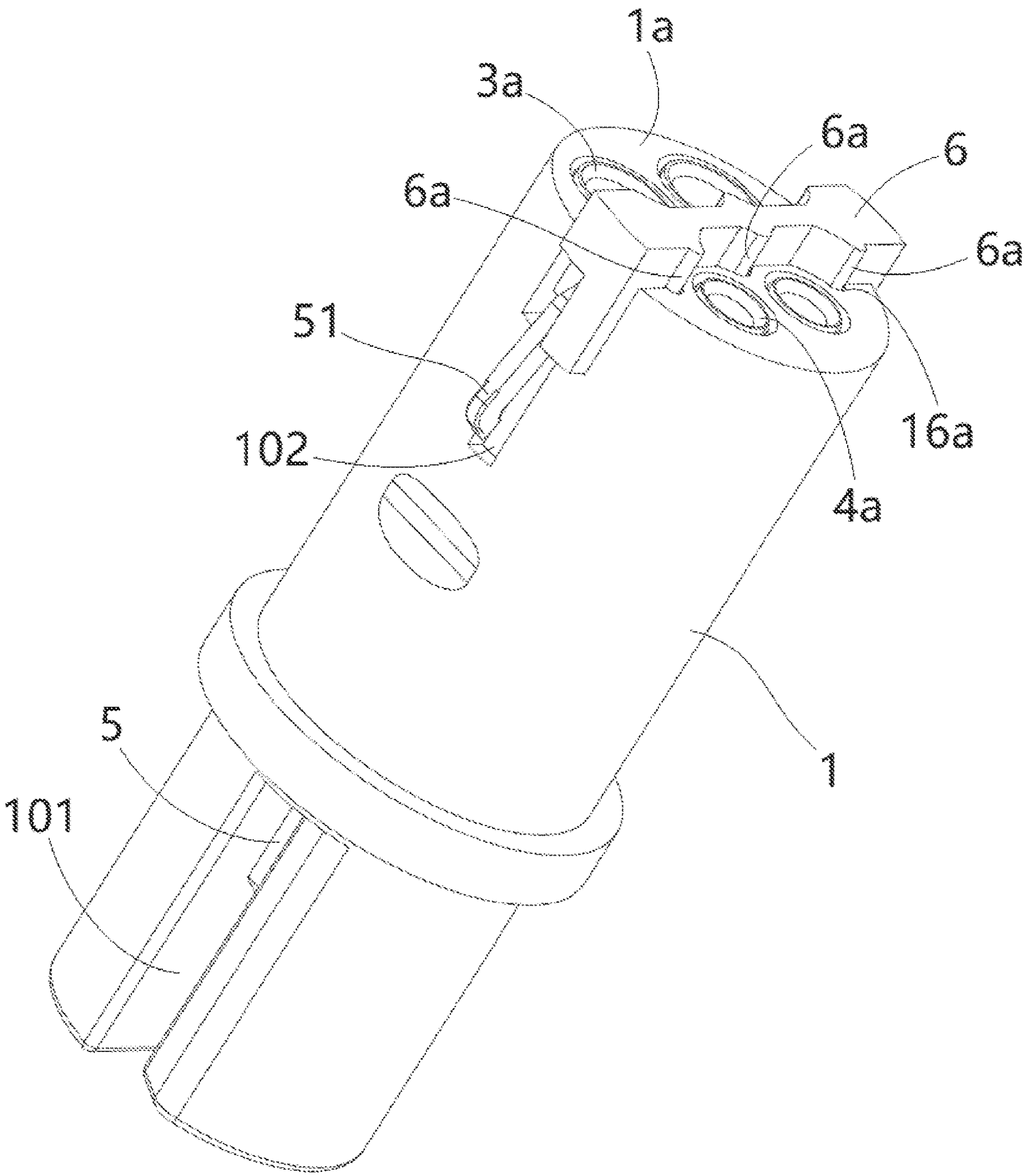
FIG. 4 is an illustrative perspective view of an insulator and an electromagnetic isolation assembly of a connector according to an exemplary embodiment of the present invention.
Figure 5:
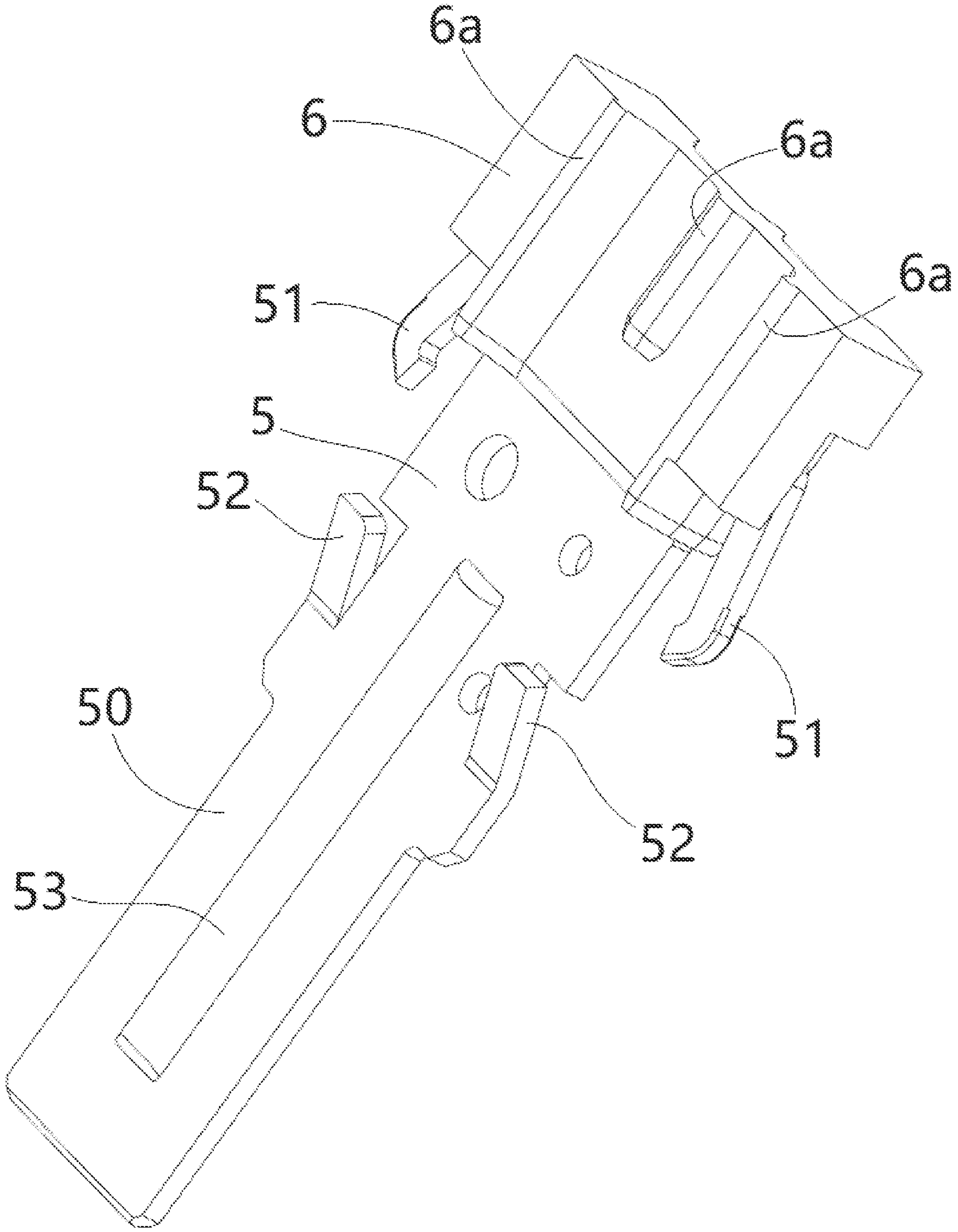
FIG. 5 is an illustrative perspective view of an electromagnetic isolation assembly of a connector according to an exemplary embodiment of the present invention.

FIG. 1 is an illustrative perspective view of a connector according to an exemplary embodiment of the present invention. FIG. 2 is an illustrative exploded view of a connector according to an exemplary embodiment of the present invention. FIG. 3 is an axial cross-sectional view of a connector according to an exemplary embodiment of the present invention. FIG. 4 is an illustrative perspective view of the insulator 1 and electromagnetic isolation assembly 5, 6 of the connector according to an exemplary embodiment of the present invention. FIG. 5 is an illustrative perspective view of the electromagnetic isolation assembly 5, 6 of the connector according to an exemplary embodiment of the present invention.

As shown in FIGS. 1-5, in an exemplary embodiment of the present invention, an electromagnetic isolation assembly 5, 6 is disclosed. The electromagnetic isolation assembly 5, 6 is suitable for inserting into a slit 101 on an insulator 1 of the connector. The electromagnetic isolation assembly 5, 6 includes a metal isolation component 5 and an electrical isolation component 6. The metal isolation component 5 is used to electromagnetically isolate a power terminal 3 inserted in the insulator 1 from a signal terminal 4 inserted in the insulator 1. The electrical isolation component 6 is fixed to the metal isolation component 5 to increase the creepage distance between the power terminal 3 and the signal terminal 4.

In the illustrated embodiments, when the electromagnetic isolation assembly 5, 6 is inserted into the insulator 1, the electrical isolation component 6 protrudes from the end face 1*a* of one end of insulator 1 along the axis of insulator 1 by a predetermined height to increase the creepage distance between one end 3*a* of the power terminal 3 and one end 4*a* of the signal terminal 4. Therefore, in the illustrated embodiment, the electrical isolation component 6 can effectively prevent signal terminal 4 from being short circuited, improving the electrical insulation performance of the connector.

One end 3*a* of the power terminal 3 extends almost flush with the opening of one end of a power terminal hole 103 on insulator 1, and one end 4*a* of the signal terminal 4 extends almost flush with the opening of one end of signal terminal hole 104 on insulator 1. Therefore, in the illustrated embodiment, the distance between one end 3*a* of the power terminal 3 and one end 4*a* of the signal terminal 4 is relatively small. Inserting the metal isolation component 5 between the power terminal 3 and the signal terminal 4 will further reduce the creepage distance between the power terminal 3 and the signal terminal 4, resulting in the creepage distance between the power terminal 3 and the signal terminal 4 not meeting the specified requirements. The other end 3*b* of the power terminal 3 is deeply buried in the power terminal hole 103 on insulator 1, and the other end 4*b* of the signal terminal 4 is deeply buried in the signal terminal hole 104 on insulator 1. Therefore, there is sufficient creepage distance between the other end 3*b* of the power terminal 3 and the other end 4*b* of the signal terminal 4. When the electromagnetic isolation assembly 5, 6 is inserted into the insulator 1, the electrical isolation component 6 protrudes a predetermined distance along the radial direction of insulator 1 from both sides of one end of the insulator 1 to further increase the creepage distance between one end 3*a* of the power terminal 3 and one end 4*a* of the signal terminal 4.

Still referring to FIGS. 1-5, in the illustrated embodiments, one or more positioning ribs 6*a* are formed on both sides of the electrical isolation component 6. The positioning rib 6*a* is used to fit with the axially extending positioning slot 16*a* on the inner wall of the inlet of the slit 101 to position the electrical isolation component 6.

The metal isolation component 5 includes a plate-shaped body 50 and a pair of elastic contact arms 51. The pair of elastic contact arms 51 are respectively formed on both sides of the width direction of the plate-shaped body 50. When the electromagnetic isolation assembly 5, 6 is inserted into the insulator 1, the elastic contact arm 51 protrudes to the outside of insulator 1 through the slot hole 102 on the insulator 1 to make electrical contact with the inner wall of the shielding shell 2 of the connector.

The metal isolation component 5 also includes elastic locking arms 52, which are respectively formed on both sides of the width direction of the plate-shaped body 50, for interference fit with the inner wall of the slit 101 of the insulator 1 to lock the metal isolation component 5 in the slit 101. The metal isolation component 5 also includes a guide rib 53. The guide rib 53 is protruded on the surface of the plate-shaped body 50 and is used to fit with the guide slot (not shown) on the inner wall of the slit 101 of the insulator 1 to guide the metal isolation component 5 into the slit 101. The electrical isolation component 6 is injection molded onto the metal isolation component 5, so that the electrical isolation component 6 and the metal isolation component 5 are formed into an integral part.

In another exemplary embodiment of the present invention, a connector is also disclosed. The connector includes the insulator 1, the power terminal 3, the signal terminal 4, and the electromagnetic isolation assembly 5, 6. The insulator 1 is formed with the slit 101, with the power terminal hole 103 and the signal terminal hole 104 located at both sides of the slit 101. The power terminal 3 is inserted into the power terminal hole 103 on insulator 1. The signal terminal 4 is inserted into the signal terminal hole 104 on insulator 1. The electromagnetic isolation assembly 5, 6 is inserted into the slit 101 on insulator 1. The metal isolation component 5 of the electromagnetic isolation assembly 5, 6 separates the power terminal 3 and signal terminal 4 electromagnetically to prevent signal terminal 4 from electromagnetic interference. In the illustrated embodiment, two power terminal holes 103 and two signal terminal holes 104 are formed on insulator 1. The connector includes two power terminals 3 inserted into two power terminal holes 103 and two signal terminals 4 inserted into two signal terminal holes 104. However, the present invention is not limited to this, and the number of power terminals 3 and signal terminals 4 can be changed according to actual needs.

As shown in FIGS. 1 to 5, the connector further includes a shielding shell 2. The shielding shell 2 is installed on the outside of insulator 1. The metal isolation component 5 divides the internal space of shielding shell 2 into two electromagnetic isolated subspaces. The power terminal 3 is located in one of the two electromagnetic isolated subspaces, the signal terminal 4 is located in the other of the two electromagnetic isolated subspaces.

A slot hole 102 communicated with the slit 101 is formed on the insulator 1. The elastic contact arm 51 on the metal isolation component 5 protrudes to the outside of the insulator 1 through the slot hole 102 on the insulator 1 and electrically contacts the inner wall of the shielding shell 2. A guide slot is formed on the inner wall of the slit 101 of the insulator 1, which is used to fit with the guide rib 53 on the metal isolation component 5 to guide the metal isolation component 5 into the slit 101.

Positioning slots 16*a* are formed on the two inner walls of the inlet of the slit 101, respectively. The positioning slots 16*a* are used to fit with the positioning ribs 6*a* on the electrical isolation component 6 to position the electrical isolation component 6. In the illustrated embodiment, the electromagnetic isolation assembly 5, 6 is inserted into slit 101 through the inlet of slit 101. The slit 101 runs axially through insulator 1. The electrical isolation component 6 protrudes axially from one end (inlet end) of slit 101 to a predetermined height to increase the creepage distance between one end 3*a* of the power terminal 3 and one end 4*a* of the signal terminal 4.

In the illustrated embodiments, the shielding shell 2 is sheathed and fixed on one end of the insulator 1. The other end of the insulator 1 extends to the outside of the shielding shell 2. The connector also includes a metal nut 7. The metal nut 7 is rotatably sleeved on the other end of the insulator 1 and is in electrical contact with the shielding shell 2. An internal thread 7*a* is formed on the metal nut 7 for connecting with a metal screw sleeve on a mating connector. An external thread 2*a* is formed on the shielding shell 2 for connecting to a nut on a circuit board.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electromagnetic isolation assembly adapted to be inserted into a slit formed in an insulator of a connector, comprising:

a metal isolation component electromagnetically adapted to isolate a power terminal inserted in the insulator from a signal terminal inserted in the insulator; and an electrical isolation component fixed to the metal isolation component and adapted to increase a creepage distance between the power terminal and the signal terminal.

2. The electromagnetic isolation assembly according to claim 1, wherein the electrical isolation component is adapted such that, when the electromagnetic isolation assembly is inserted into the insulator, the electrical isolation component protrudes a predetermined non-zero height along an axis of the insulator from an end face of an end of the insulator.

3. The electromagnetic isolation assembly according to claim 1, wherein the electrical isolation component is adapted such that, when the electromagnetic isolation assembly is inserted into the insulator, the electrical isolation component protrudes a predetermined distance along a radial direction of the insulator from both sides of an end of the insulator.

4. The electromagnetic isolation assembly according to claim 1, wherein positioning ribs are formed on each side of the electrical isolation component and are adapted to engage with axially extending positioning slots on an inner wall of an inlet of the slit.

5. The electromagnetic isolation assembly according to claim 1, wherein the metal isolation component includes:

a plate-shaped body; and a pair of elastic contact arms formed on each side of the plate-shaped body in a width direction of the plate-shaped body.

6. The electromagnetic isolation assembly according to claim 5, wherein, when the electromagnetic isolation assembly is inserted into the insulator, the elastic contact arm protrudes to an outside of the insulator through a slot hole on the insulator to electrically contact with an inner wall of a shielding shell of the connector.

7. The electromagnetic isolation assembly according to claim 5, wherein the metal isolation component further includes an elastic locking arm formed each of the sides of the plate-shaped body and adapted to lock the metal isolation component within the slit.

8. The electromagnetic isolation assembly according to claim 7, wherein the metal isolation component further includes a guide rib formed on a surface of the plate-shaped body and adapted to engage with a guide slot on an inner wall defining the slit of the insulator to guide the metal isolation component into the slit.

9. The electromagnetic isolation assembly according to claim 1, wherein the electrical isolation component is injection molded onto the metal isolation component.

10. A connector, comprising:

an insulator defining a slit, and a power terminal hole and a signal terminal hole located at each of two sides of the slit;

a power terminal inserted into the power terminal hole;

a signal terminal inserted into the signal terminal hole; and an electromagnetic isolation assembly inserted into the slit on the insulator, including:

a metal isolation component electromagnetically isolating the power terminal from the signal terminal; and an electrical isolation component fixed to the metal isolation component and increasing a creepage distance between the power terminal and the signal terminal.

11. The connector according to claim 10, further comprising a shielding shell sheathed on the insulator.

12. The connector according to claim 11, wherein the metal isolation component separates an internal space of the shielding shell into two electromagnetic isolated subspaces, the power terminal is located in one of the two electromagnetic isolated subspaces, and the signal terminal is located in the other of the two electromagnetic isolated subspaces.

13. The connector according to claim 11, wherein:

a slot hole is formed on the insulator in communication with the slit; and the elastic contact arm on the metal isolation component protrudes to an outside of the insulator through the slot hole on the insulator and is in electrical contact with the inner wall of the shielding shell.

14. The connector according to claim 11, wherein the shielding shell is sheathed and fixed on a first end of the insulator, and a second end of the insulator extends to an outside of the shielding shell.

15. The connector according to claim 14, wherein the connector further comprises a metal nut rotatably sheathed on the second end of the insulator and in electrical contact with the shielding shell.

16. The connector according to claim 15, wherein:

an internal thread is formed on the metal nut and adapted to engage with a fastener on a mating connector; and an external thread is formed on the shielding shell and adapted to engage with a fastener on a circuit board.

17. The connector according to claim 10, wherein a guide slot is formed on an inner wall of the slit of the insulator and mates with a guide rib of the metal isolation component to guide the metal isolation component into the slit.

18. The connector according to claim 10, wherein two positioning slots are formed on two inner sidewalls of an inlet of the slit.

19. The connector according to claim 18, wherein each of the positioning slots engages with a respective positioning rib defined on the electrical isolation component to position the electrical isolation component.

20. The connector according to claim 10, wherein the slit runs axially through the insulator, and the electrical isolation component protrudes axially from one end of the slit to a predetermined height.

* * * * *